United States Patent [19]
Yaita

[11] 3,765,814
[45] Oct. 16, 1973

[54] APPARATUS HAVING PLURAL MOLD MEMBERS FOR PRODUCING SHAPED ARTICLES OF FOAMED THERMOPLASTIC RESIN

[75] Inventor: Masato Yaita, Ibaraki, Japan

[73] Assignee: Sekisui Plastic Co., Ltd., Nara, Japan

[22] Filed: Nov. 24, 1971

[21] Appl. No.: 201,897

[30] Foreign Application Priority Data
Nov. 24, 1970 Japan.............................. 45/103792
July 1, 1971 Japan................................ 46/47655

[52] U.S. Cl..................... 425/233, 264/51, 425/817
[51] Int. Cl............................................. B29d 27/04
[58] Field of Search.................... 425/233, 234, 236, 425/408, 817; 264/51

[56] References Cited
UNITED STATES PATENTS
| | | | |
|---|---|---|---|
| 1,509,456 | 9/1924 | Van Hullen......................... | 425/234 |
| 2,869,177 | 1/1959 | Jurgeleit.......................... | 425/234 X |
| 2,965,928 | 12/1960 | Vdolek............................. | 425/236 |
| 3,533,137 | 10/1970 | Michelson.......................... | 425/408 |
| 3,669,601 | 6/1972 | Laihesse.......................... | 425/234 X |
| 3,671,162 | 6/1972 | Lohmann......................... | 425/817 X |

*Primary Examiner*—R. Spencer Annear
*Attorney*—Sughrue, Rothwell, Mion, Zinn & Macpeak

[57] ABSTRACT

A process and apparatus for producing shaped articles of foamed thermoplastic resin, wherein there are two mold cavities that are opened and closed separately by at least one slidable cylinder. Movable mold members are secured to both ends of the cylinder and serve to define the mold cavities together with stationary mold members.

3 Claims, 10 Drawing Figures

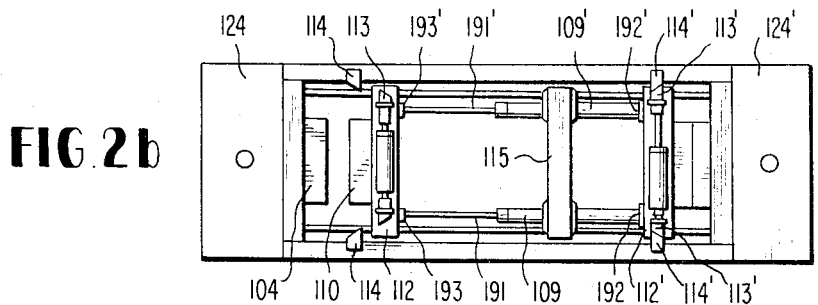
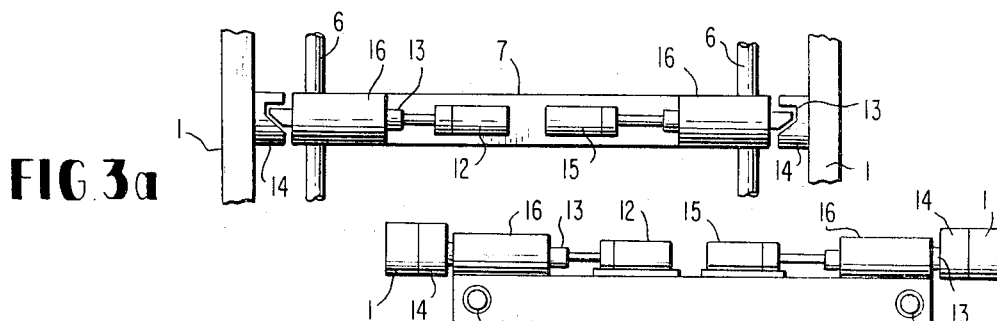
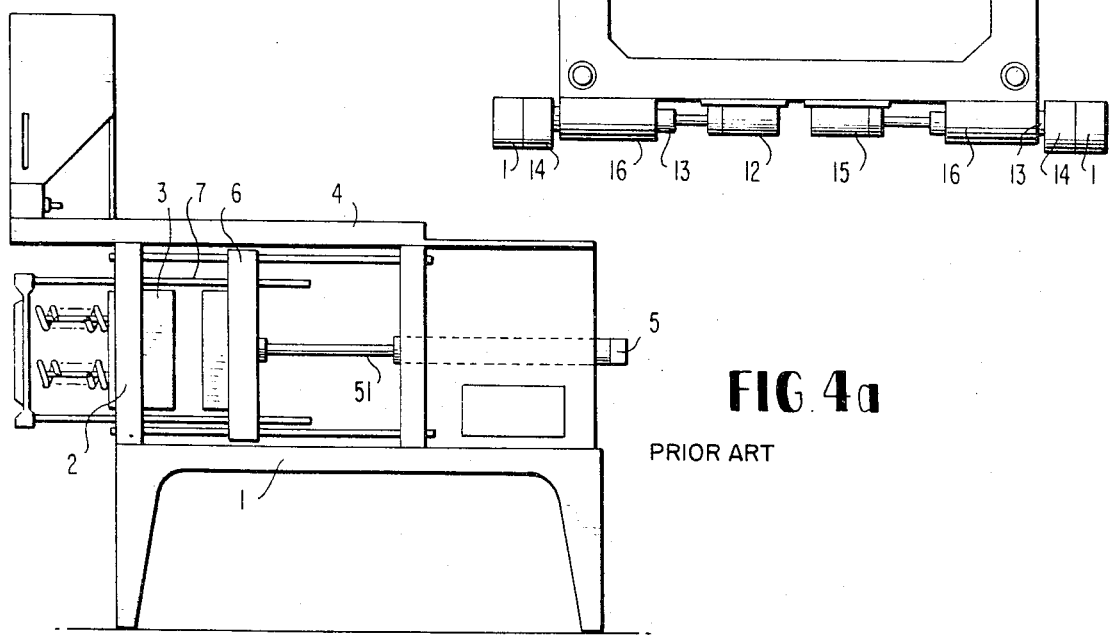

APPARATUS HAVING PLURAL MOLD MEMBERS FOR PRODUCING SHAPED ARTICLES OF FOAMED THERMOPLASTIC RESIN

BACKGROUND OF THE INVENTION

1. Field of the Invention

This invention relates to a process for producing shaped articles of foamed thermoplastic resin, and to a novel structure of a molding apparatus for producing the same. More specifically, the invention relates to a molding apparatus equipped with two mold cavities for producing shaped articles of foamed thermoplastic resin with good efficiency, wherein the closing and opening of the two mold cavities are performed separately by at least one slidable cylinder to both ends of which are secured movable mold members which form the mold cavities together with stationary mold members.

2. Description of the Prior Art

In the conventional process for producing shaped articles of foamed thermoplastic resin comprising charging granules of a foamable thermoplastic resin into a mold cavity formed by a pair of matching molds, heating the granules to a temperature higher than the softening point thereof with a heating medium such as steam or heated air so as to foam up the granules and to fuse and coalesce the individual granules into a shaped article of foamed thermoplastic resin by separating the pair of matching molds, a molding machine of the type shown in FIG. 4 of the accompanying drawings has been used. This molding machine includes a fixed mold 3 secured to a stationary frame 2 extending from a machine stand 1, and having formed in its inner wall a plurality of holes or perforations which permit the escape of gases but retain the granules of foamable thermoplastic resin, and a movable mold 7 secured to a frame 6 and having the same holes as in the fixed mold member 3, which movable mold member 7 is capable of forming a mold cavity with the fixed mold member 3 when it comes face to face with the fixed mold member 3, the frame 6 being supported by a plurality of substantially parallel supporting rods 4 mounted on the stand 1 and being in slidable contact with the end of a piston rod 51 of a cylinder 5 which is fixed to the stand 1 and operable by hydraulic or pneumatic pressure. The granules of foamable thermoplastic resin are fused and coalesce in the mold cavity formed by the mold members 3 and 7, and then the movable mold member 7 is separated from the fixed mold member 3 by the action of the cylinder 5 to open the mold cavity. In other words, this molding machine is of the type in which one mold cavity is opened and closed by one cylinder.

With the conventional molding machine of such a structure, only one mold cavity is formed in one machine. The output of shaped articles of foamed thermoplastic resin per unit time is therefore small, and this inevitable results in an increased cost of the articles produced. The output of the articles per unit time may be increased by providing an increased number of the molding machines. It must be noted, however, that since the molding machines have various attachments such as raw material feed hoppers or hydraulic or air pumps, or have distributing pipes for passing through steam or cooling water, they are required to be spaced from each other by some distance for reasons of working efficiency and prevention of danger. Consequently, a larger floor space is needed for each molding machine, and the provision of more molding machines does not lead to a reduction in cost but the overall cost becomes all the more higher.

SUMMARY OF THE INVENTION

Accordingly, a primary object of the present invention is to provide a molding machine for the production of shaped articles of foamed thermoplastic resin, which includes at least two mold cavities provided within the machine in opposing relation to one another, and thus eliminates the abovementioned defects of the conventional molding apparatus.

Other objects of the present invention along with its advantages will become apparent from the following description.

According to the present invention, there is provided a process for continuously producing shaped articles of foamed thermoplastic resin, comprising the steps of:

a. engaging a first movable mold member, integrally connected to the end of at least one piston rod through a first movable frame, with a first stationary mold member fixed to a first stationary frame vertically and upwardly mounted on a machine stand to form a first mold cavity, forming a shaped article of foamed thermoplastic resin therein by exerting pressure on at least one slidable cylinder corresponding to the piston rod and having a second movable mold member so as to eject the piston rod from the cylinder, the second movable mold member being integrally connected to the rearward end of the cylinder through a second movable frame, at this time, the second movable frame being fixed to the machine stand under the action of a second locking device; charging granules of a foamable thermoplastic resin in the first mold cavity; heating the granules to foam them into a first shaped article; cooling the first article in the first mold cavity, the charging, heating and cooling steps being carried out in sequence while keeping the first mold cavity closed by fixing the first movable frame to the machine stand under the action of a first locking device; and separating the first movable mold member from the first stationary mold member to remove the first shaped article by releasing the first locking device and letting out pressure from said cylinder so as to retract the piston rod into the cylinder, at this time, the second movable frame being again fixed to the machine stand under the action of the second locking device, and b. engaging the second movable mold member with a second stationary mold member fixed to a second stationary frame vertically and upwardly mounted on the machine stand to form a second mold cavity by exerting pressure on the cylinder so as to slide the cylinder on the periphery of the piston rod in the direction of the second stationary mold member, at this time, the first movable frame being fixed to a machine stand under the action of the first locking device; charging granules of a foamable thermoplastic resin within the second mold cavity; heating the granules to foam them into a second shaped article; cooling the second article in the second mold cavity, the charging, heating and cooling steps being carried out in sequence while keeping the second mold cavity closed by fixing the second movable frame to the machine stand under the action of the second locking device; and separating the second movable mold member from the second stationary mold member to remove the second shaped article by releasing the second locking device and letting out pressure from the cylinder so as to slide the cylinder on the periphery of the piston rod in a direction opposite to the second stationary mold member, at this time, the first movable frame being again fixed to the machine stand under the action of the second locking device.

The process of the present invention is performed in accordance with one embodiment of the invention using an apparatus for producing a shaped article of foamed thermoplastic resin, the apparatus comprising, in combination, a machine stand; first and second stationary frames vertically and upwardly mounted on the stand in opposed relation to each other; a first stationary mold member secured to the first frame; a second stationary mold member secured to the second frame; a plurality of supporting rods in substantially parallel relation with the stand and having both ends fixed to the pair of frames; first and second movable frames disposed around and slidable mounted on the supporting rods; a slidable cylinder having one piston rod, the end of this piston rod being secured to the first movable frame and the rearward end of the cylinder being secured to the second movable frame; a first movable mold member secured to the end of the piston rod through the first movable frame; a second movable mold member secured to the rearward end of the cylinder through the second movable frame; and first and second locking devices for fixing the first and second movable frames to the machine stand, each of the locking devices being composed of a slidable stopper provided on the machine stand, a cylinder having one or two piston rods and secured to each of the movable frames, and locking rods secured to both ends of each piston rod for tight engagement with the stopper, wherein: the first movable mold member is engaged with the first stationary mold member to form a first mold cavity being charged with granules of a foamable thermoplastic resin therein and forming a foamed shaped article from the granules by exerting pressure on the cylinder so as to eject the piston rod while fixing the second movable frame to the machine stand under the action of the second locking device, and the first movable mold member is separated from the first stationary mold member to remove the article by releasing pressure from the cylinder so as to retract the piston rod into the cylinder while fixing the second movable frame to a machine stand under the action of the second locking device; and the second movable mold member is engaged with the second stationary mold member to form a second mold cavity being charged granules of a foamable thermoplastic resin therein and forming a foamed shaped article made from the granules by exerting pressure on the cylinder so as to slide the cylinder on the periphery of the piston rod in the direction of the second stationary frame while fixing the first movable frame to the machine stand under the action of the first locking device, and the second movable mold member is separated from the second stationary mold member to release the article by removing pressure from the cylinder so as to slide the cylinder on the periphery of the piston rod in the direction opposite to the second stationary frame while fixing the first movable frame under the action of the first locking device.

In an alternate embodiment, the process of the invention is carried out using an apparatus for producing a shaped article of a foamed thermoplastic resin, comprising, in combination, a machine stand; first and second stationary frames vertically and upwardly mounted on the stand in opposing relation to each other; a first stationary mold member secured to one of the frames; a second stationary mold member secured to the other frame; a plurality of supporting rods in substantially parallel relation with the stand and having both ends fixed to the pair of frames; first and second movable frames disposed around and slidably mounted on the supporting rods; a plurality of slidable cylinders having one piston rod respectively, the end of this piston rod being secured to the first movable frame and the rearward ends of the cylinders being secured to the second movable frame; a first movable mold member secured to the ends of the piston rods through the first movable frame; a second movable mold member secured to the rearward ends of the cylinders through the second movable frame; and first and second locking devices for fixing the first and second movable frames to the machine stand, each of the locking devices being composed of a slidable stopper provided on the machine stand, a cylinder having one or two piston rods and secured to each of the movable frames and locking rods seucred to both ends of each piston rod for tight engagement with the stopper, wherein: the first movable mold member is engaged with the first stationary mold member to form a first mold cavity being charged with granules of a foamable thermoplastic resin therein and forming a foamed shaped article made from the granules by exerting pressure on the cylinder so as to eject said piston rod while fixing the second movable frame to the machine stand under the action of the second locking device, and the first movable mold member is separated from the first stationary mold member to remove the article by releasing pressure from the cylinder so as to retract the piston rod into the cylinder while fixing the second movable frame to the machine stand under the action of the second locking device; and the second movable mold member is engaged with the second stationary mold member to form a second mold cavity being charged with granules of a foamable thermoplastic resin therein and forming a foamed shaped article made from the granules by exerting pressure on the cylinder so as to slide the cylinder on the periphery of the piston rod in the direction of the second stationary frame while fixing the first movable frame to the machine stand under the action of the first locking deivce, and the second movable mold member is separated from the second stationary mold member to remove the article by releasing pressure from the cylinder so as to slide the cylinder on the periphery of the piston rod in the direction opposite to the second stationary frame while fixing the first movable frame under the action of the first locking device.

The process and apparatus of the present invention are applicable primarily to the foaming of polystyrene. Examples of the other thermoplastic resins that can be used in the invention include methyl methacrylate, styrene-acrylonitrile copolymer, butadiene-acrylonitrile-styrene copolymer, polyethylene and polypropylene. These thermoplastic resins can be rendered foamable by the incorporation of a volatile organic liquid blowing agent such as propane, butane, pentane, hexane, or fluorinated hydrocarbons, or a chemical blowing agent such as azodicarbonamide or dinitropentamethylene tetramine.

BRIEF DESCRIPTION OF THE DRAWINGS

The invention will now be described in greater detail with reference to the accompanying drawings in which:

FIG. 3 is an enlarged view of the locking devices of the apparatus shown in FIG. 1;

DESCRIPTION OF THE PREFERRED EMBODIMENTS

Figure 1A:
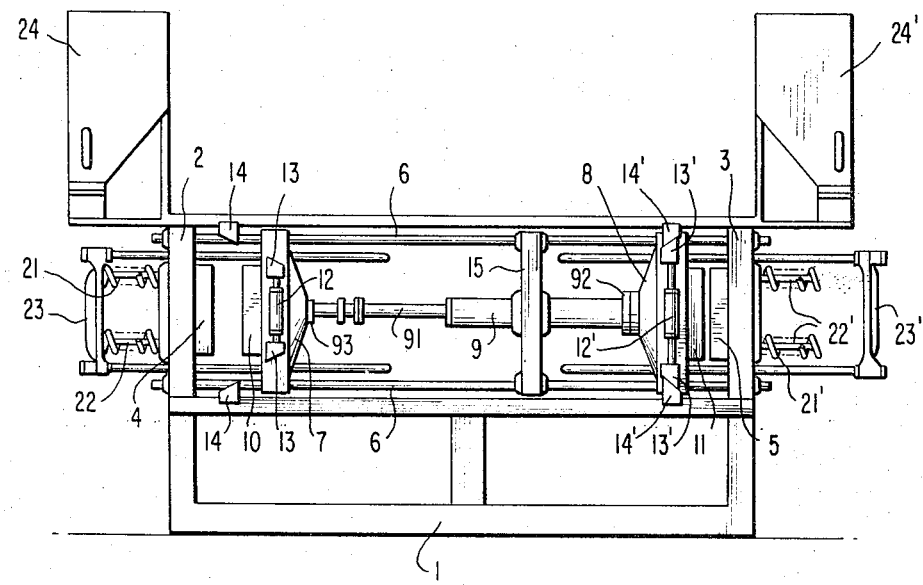
FIG. 1 illustrates one embodiment of the molding apparatus of the present invention for producing shaped articles of foamed thermoplastic resin in accordance with the present invention, with (a) being a front elevational view and (b) being a top plan view.
Figure 1B:
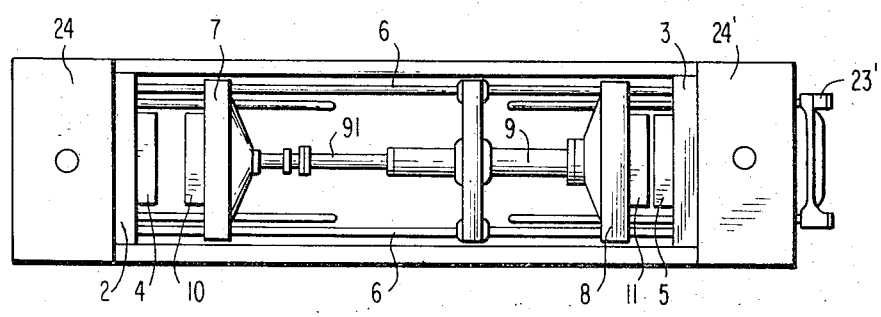

First, with reference to FIG. 1, stationary frames 2 and 3 extending vertically are mounted on both sides of a machine stand 1. Stationary mold members 4 and 5, which have a number of apertures which permit the excape of a heating medium such as steam or heated air but retain the granules of a foamable thermoplastic resin, such as polystyrene, are secured respectively to the stationary frames 2 and 3. Each of the mold members 4 and 5 includes a heating medium feed opening, a cooling water feed opening, a water discharge opening, and an opening for charging foamable thermoplastic resin granules. Knock-out pins 22 and 22' act to remove the resulting foamed shaped article which is adhered to the stationary mold members 4 and 5, respectively, through small holes extending therethrough.

Mold-fitting frames 7 and 8 are disposed between the frames 2 and 3, and are supported slidably by a plurality of supporting rods 6 extending between the stationary frames 2 and 3 above the machine stand 1 in substantially parallel relation to each other. The frames 7 and 8 confront the mold members 4 and 5, respectively, and are slidable. To the frames 7 and 8 are secured movable mold members 10 and 11, respectively, which have a number of small apertures provided in the inner walls and include a heating medium opening, a cooling water feed opening, and a water discharge opening that are substantially the same as in the stationary molds 4 and 5.

The stationary mold members 4 and 5, when brought into engagement with the movable mold members 10 and 11, respectively, form mold cavities of the same configuration or design as the desired shaped articles of foamed thermoplastic resin.

A cylinder 9 having a piston rod 91 is provided between the frames 7 and 8 with a forward end portion 93 connected to the frame 7 and a rearward end portion 92 connected to the frame 8, thereby connecting the two frames 7 and 8 to each other. Upon pressurization of the cylinder 9 by a hydraulic pressure or pneumatic pressure, the piston rod 91 is ejected from the cylinder 9, and when there is no pressure within the cylinder 9, the rod 91 retracts into the cylinder 9. The frames 7 and 8 move slidingly by the actuation of the cylinder 9 connecting the frames 7 and 8 to each other. Hence, the movable mold members 10 and 11 secured respectively to the frames 7 and 8 move together with the frames 7 and 8. The cylinder 9 is supported slidably by the supporting rods 6 through a slide member 15 which moves slidably on the supporting rods 6.

The actuation of the cylinder 9 causes the closing or opening of mold cavities formed between the mold members 4 and 10 and between the mold members 5 and 11.

Locking devices are provided between the frames 7 and 8 and the machine stand 1 for stopping the frames 7 and 8. Each locking device comprises a locking rod and a stopper. Cylinders 12 and 12' each having one or two piston rods which eject from, and retract into, the cylinders in one or two directions are held respectively to the frames 7 and 8. The locking rods 13 and 13' are fixed to the forward ends of the piston rods of the cylinders 12 and 12' and have an inclined top-surface at their forward ends. Stoppers 14 and 14' are provided on the machine stand 1 at such positions that the stoppers connect with the locking rods 13 and 13', which are ejected by the action of the cylinders 12 and 12', respectively when the first and second movable mold members 10 and 11 are engaged with the first and second stationary mold members 4 and 5, respectively. The stoppers 14 and 14' have the same inclined top-surface as those of locking rods 13 and 13' at their forward ends for tight engagement therewith, and are slidable corresponding to the size of the mold cavity. When the locking rods 13 and 13' abut the stoppers 14 and 14', respectively, the stationary mold members 4 and 5 are clamped with the movable mold members 10 and 11, respectively, by means of the inclinations provided in the rods 13 and 13' and the stoppers 14 and 14'.

A significant feature of the present invention is the provision of the cylinder having only one piston rod and being slidable linearly, and the locking devices for fixing the movable frames having the movable mold members, which are secured to the forward end of the piston rod and to the rearward portion of the cylinder, and to the machine stand at such positions that the piston rod is not fitted. With the conventional molding machines for production of shaped articles of foamed thermoplastic resin, such as foamed polystyrene, the cylinder for opening and closing the mold cavity is fixed, and only the piston rod repeatedly ejects from the retracts into the cylinder. Therefore, this structure causes the various defects described above. In contrast, according to the present invention, the mold members 10 and 11 are moved slidably by the actuation of the cylinder 9 and come into engagement with the stationary mold members 4 and 5 respectively. The mold members 4 and 5 are then clamped respectively with the movable mold members 10 and 11 by the locking rods 13 and 13' and the stoppers 14 and 14' to form two mold cavities. A shaped article of foamed thermoplastic resin is produced in the mold cavities. When it is desired to open one of the two mold cavities, the frame 7 or 8 is stopped so as not to open the other cavity and the pressure in the cylinder 9 is cut off. It is thus possible to open the one mold with the frame 7 or 8 acting as a support. Shaped articles of foamed thermoplastic resin, therefore, can be obtained without any trouble in the respective mold cavities even when the molding time differs between the two mold cavities.

Knock-out pin push plates 23 and 23' are provided integrally with the frames 7 and 8, respectively, so as to push the knock out pins 22 and 22' with the slidable movement of the frames 7 and 8 in a manner to open the respective mold cavities, and to remove the shaped articles of foamed thermoplastic resin from the mold members 4 and 5, respectively. The knock out pins 22 and 22', which have been projected into the mold cavities by the action of the push plates 23 and 23', are returned to their original positions by springs 21 and 21'. Hoppers 24 and 24' adapted to contain a supply of foamable thermoplastic resin granules are supported upwardly of the frames 2 and 3. In order to obtain a foamed shaped article of low density, it is preferred to use foamable thermoplastic resin granules which have been preexpanded to a density of approximately 0.033 to 0.016 g/cm$^3$.

The operation of the molding apparatus of the present invention will be described with reference to the production of shaped articles of foamed polystyrene.

A hydraulic or pneumatic pressure is exerted on the cylinder 9 to eject the piston rod 91, and the mold members 4 and 5 are brought into engagement with the movable mold members 10 and 11, respectively. The cylinders 12 and 12' are actuated to hold the frames 7 and 8 stationary by the locking rods 13 and 13' and the stoppers 14 and 14', and a mold cavity is formed between the mold members 4 and 10, and between the mold members 5 and 11. Foamable polystyrene granules, preferably pre-expanded to a density of approximately 0.020 g/cm$^3$, are charged from the hoppers 24 and 24' into the mold cavitites through charge openings provided in the stationary mold members 4 and 5. The charge openings are then closed, and steam having a temperature of 100°C to 120°C is blown into the cavities through heating medium feed openings provided in the mold members 4, 5, 10 and 11. The foamable polystyrene granules are heated in the mold cavity at the temperature of 100°C to 120°C for approximately one minute and thirty seconds by the steam to fuse and coalesce the individual granules into a molded article. After heating, the blowing of steam is stopped, and cooling water is introduced through cooling water feed openings for approximately 2 minutes whereby the foamed shaped article is cooled unitl it no longer expands. The locking rod 13 and the stopper 14 are then disengaged from the frame 7, and the movable mold member 10 is moved to open the mold cavity. At the same time, the push plate 23 provided integrally with the frame 7 slides with the sliding movement of the frame 7, and pushes the knock out pin 22, thereby to remove the foamed shaped article adhered to the stationary mold member 4. After mold release, the cylinder 9 is again pressurized to eject the piston rod 91 with the frame 8 held staionary acting as a support, and the movable mold member 10 comes into engagement with the stationary mold member 4 to form a mold cavity. Cylinder 12 is then actuated to cause the locking rod 13 and the stopper 14 to clamp the mold cavity and hold the frame 7 stationary. At this time, the knock out pin 22 is retracted by the spring 21. Again, foamed polystyrene granules are charged into the mold cavity and shaped in the same way as described above.

When, during the molding operation, the pressure of the cylinder 12' is cut off to disengage the locking rod 13' and the stopper 14', and the pressure of the cylinder 9 is also cut off, the cylinder 9 advances with the frame 7 as a support in a manner to include the piston rod 91 therein, and moves the movable mold member 11 to open the mold cavity. Simultaneously with this, the knock out pin push plate 23' provided integrally with the frame 8 slides together with the sliding movement of the frame 8 and pushes the knock out pin 22', thereby to remove the foamed shaped article adhered to the stationary mold member 5. After mold release, the cylinder 9 is again pressurized, and brings the mold members 5 and 11 into engagement with each other to form a mold cavity. The same operation as described above is then repeated. Thus, the molding of foamed polystrene granules can be performed in the respective mold cavities substantially independently from each other. The foamed shaped article of polystyrene so obtained has a density of 0.020 g/cm$^3$ and the granules are completely fused and coalesced into a shaped article.

Since in the molding apparatus of the present invention, the cylinder is slidable and it is possible to take a large stroke in mold movement in proportion for two mold cavities, the molding operation can be efficiently performed without any trouble even if the molding conditions are different between the two mold cavities. Furthermore, one molding apparatus according to this first embodiment has an output capacity corresponding to two conventional molding machines and, therefore, shaped articles of foamed thermoplastic resin can be produced at low costs. A further advantage of the molding apparatus according to this embodiment is that when it is desired to exchange or repair one mold cavity, the stopper is deviated by an extent necessary for work and brought into engagement with the locking rod, whereby the exchanging or repairing work can be performed without stopping the molding operation in the other mold.

Figure 2A:
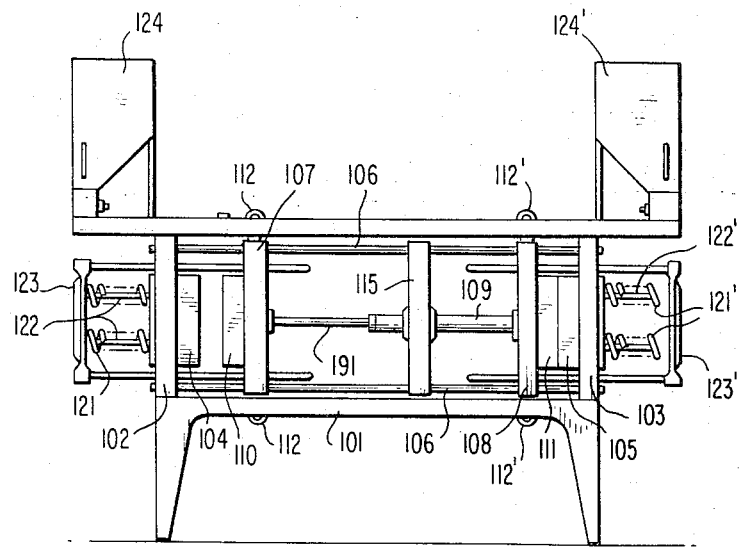
FIG. 2 illustrates another embodiment of the molding apparatus of the present invention, with (a) being a front elevational view and (b) being a top plan view.
Figure 4B:
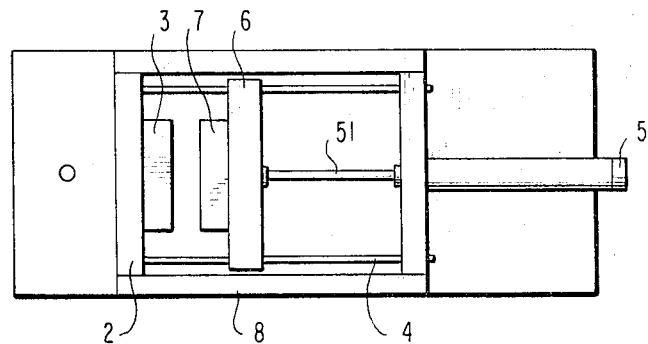
FIG. 4 illustrates a conventional apparatus for producing shaped articles of foamed thermoplastic resin, with (a) being a front elevational view and (b) being a top plan view.

Now, with reference to FIG. 2, another embodiment of the molding machine of the invention will be described.

Vertically-extending stationary frames 102 and 103 are mounted on both sides of a machine stand 101. Stationary mold members 104 and 105, which have a number of apertures that permit the escape of a heating medium such as steam or heated air but retain the granules of a foamable thermoplastic resin, such as polystyrene, are secured respectively to the stationary frames 102 and 103 corresponding with each other. Each of the mold members 104 and 105 includes a heating medium feed opening, a cooling water feed opening, a water discharge opening, and an opening for charging the granules of a foamable thermoplastic resin. Knock-out pins 122 and 122' act to remove the resulting foamed shaped article glued to the stationary mold members 104 and 105, respectively, through small holes extending therethrough. Mold-fitting frames 107 and 108 are disposed between the frames 102 and 103 and are supported slidably by a plurality of supporting rods 106, 106' . . . , extending between the stationary frames 102 and 103 above the machine stand 101 in substantially parallel relation to one another. The frames 107 and 108 confront the stationary mold members 104 and 105, respectively. To the frames 107 and 108 are secured movable mold members 110 and 111, respectively, which have a number of small apertures provided in the inner walls and include a heating medium feed opening, a cooling water feed opening, and a water discharge opening corresponding to the openings in the stationary mold members 104 and 105, these mold members being referred to as movable mold members 110 and 111.

The stationary mold members 104 and 105, when brought into confronting the close relationship with the movable mold members 110 and 111, respectively, form mold cavities of the same configuration or design as the desired shaped articles of foamed thermoplastic resin.

Cylinders 109 and 109', having only one piston rod 191 or 191' and aligned in parallel relation to each other in the same direction, are provided between the frame 107 and 108, with forward ends 193 and 193' connected to the frame 107 and rearward portions 192 and 192' of the cylinders 109 and 109' connected to the frame 108, thereby connecting the two frame 107 and 108. Upon pressurization of each of the cylinders 109 and 109' by hydraulic or pneumatic pressure, the piston rods 191 and 191' are ejected from the cylinders 109 and 109', respectively, and when the pressure is cut off, the rods 191 and 191' retract into the cylinders 109 and 109', respectively. The cylinders 109 and 109' are of the same size and of the same length when the piston rods 191 and 191' are ejected from the cylinders. Therefore, the ejections or retractions of the piston rods 191 and 191' are simultaneously performed. By the simultaneous actuation of the cylinders 109 and 109', the frames 107 and 108 move slidably. Hence, the movable mold members 110 and 111 secured to the frames 107 and 108, respectively, move with the sliding of the frames 107 and 108. The cylinders 109 and 109' are slidably supported by the supporting rods 106 through a slide member 115.

Locking devices for stopping the frames 107 and 108 are provided between the movable frame 107 and the machine stand 101, and between the movable frame 108 and the machine stand 101. Each locking device includes a locking rod having an inclined top-surface at its forward end, and a supporting block and a stopper having the same inclined top-surface as the locking rod. Cylinders 112 and 112', equipped with one or two piston rods ejecting or retracting in one or two directions, are secured to the frames 107 and 108, respectively. To the forward ends of the locking rods 113 and 113' are secured the piston rods, respectively. Supporting blocks 116 and 116' are fixed to the frames 107 and 108, respectively, for supporting the locking rods.

Stoppers 114 and 114' are provided on the machine stand 101 at such positions that the stoppers 114 and 114' connect with the locking rods 113 and 113' by ejecting the rods 113 and 133', respectively, under the action of the cylinders 112 and 112' when the first and second movable mold members 110 and 111 are engaged with the first and second stationary mold members 104 and 105, respectively. The stoppers 114 and 114' can be slidable on the machine stand so as to cope with the sizes of the mold cavities. When the locking rods 113 and 113' eject from the cylinders 112 and 112' by the actuation of the cylinders, and come into adjacent relation with the stoppers 114 and 114', the movable mold members 104 and 105 are fixed to the machine stand.

A significant feature of the present invention is the provision of a plurality of cylinders having only one piston rod and simultaneously being slidable linearly in one direction in parallel relation to one another, and the locking devices for fixing the movable frames, having the movable mold members which are secured to the forward ends of the piston rods and to the rearward portions of said cylinders, to the machine stand at such positions that the piston rods are not fitted. With the conventional molding machines for production of shaped articles of foamed thermoplastic resin, such as foamed shaped polystyrene, the cylinder for opening and closing the mold cavity is fixed, and only the piston rod repeatedly ejects from, and retracts into, the cylinder. Therefore, this conventional structure causes the various defects described above. In contrast, according to the present invention, the mold members 110 and 111 are moved slidably by the simultaneous actuation of the cylinders 109 and 109' and brought into engagement with the mold members 104 and 105. The mold members 104 and 105 are then clamped respectively with the mold members 110 and 111 by the locking rods 113 and 113' and the stoppers 114 and 114' to form two mold cavities. A shaped article article of foamed thermoplastic resin is produced in each of the mold cavities. When it is desired to open one of the two mold cavities, the frame 107 or 108 is stopped so as not to open the other cavity and the pressure of the cyliners 109 and 109' is cut off. It is thus possible to open the one mold with the frame 107 or 108 acting as a support. Shaped articles of foamed thermoplastic resin can therefore be obtained without any trouble in the respective mold cavities even when the molding time differs between the two molds cavities.

In the present invention, the strength of the movable frame 107 and 108 can be reduced by the provision of a plurality of cylinders adapted to operate simultaneously in one direction in parallel relation with each other. Furthermore, by providing a slidable frame between the stationary frames 102, 103 and the movable frame 107, 108, respectively, through the supporting rods 106 and 106' . . . , securing mold members to both sides of the frame so as to correspond to the mold members 104 and 105 and the movable mold members 110 and 111, and adapting them to slide with the movement of the movable frame 107 and 108, four or even more mold cavities can be formed, and therefore, a number of shaped articles of foamed thermoplastic resin can be obtained.

Figure 5A:
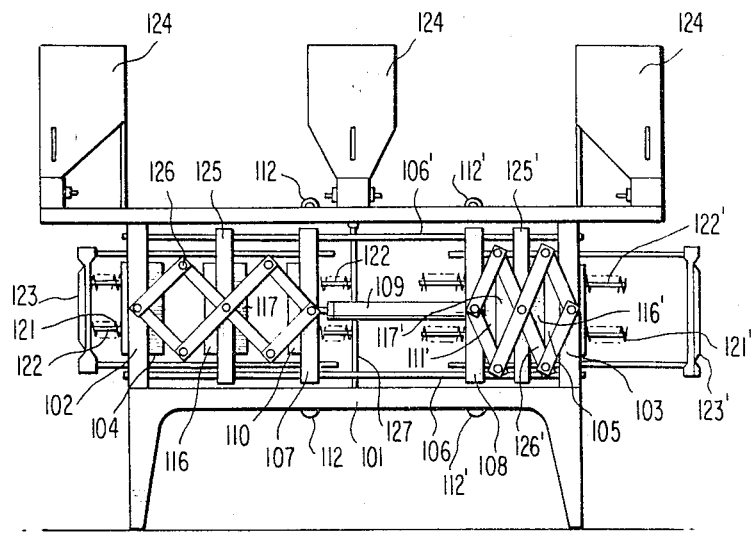
FIG. 5 illustrates still another embodiment of the molding apparatus of the present invention for producing shaped articles of foamed thermoplastic resin in accordance with the present invention, with (a) being a front elevational view and (b) being a top plan view.
Figure 5B:
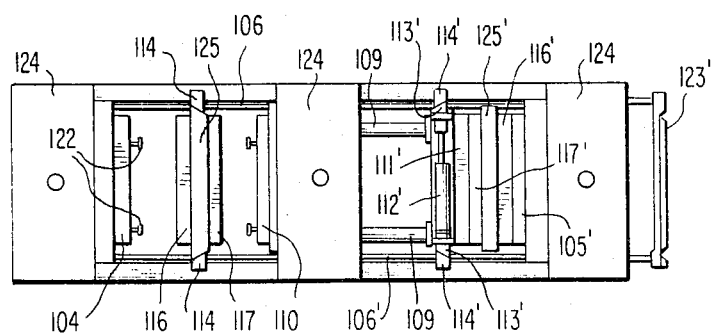

One embodiment of this type is shown in FIG. 5, namely slidable frames 125 and 125', having movable mold members 116 and 117, and 116' and 117' at both of their sides, respectively, which correspond to the stationary mold member 104 and movable mold member 110, and the stationary mold member 105 and movable mold member 111, respectively, are provided between the stationary frame 102 and movable frame 107 and between stationary frame 103 and movable frame 108 respectively through a plurality of supporting rods 106, 106' . . . .

Moreover, by providing universal coupling members 126 and 126' among the movable frames 107 and 108, the slidable frames 125 and 125' and the stationary frames 104 and 105 respectively, the slidable frames 125 and 125' can slide on the peripheries of the supporting rods 106, 106' . . . , in response to movement of the movable frames 107 and 108, respectively, under the action of a plurality of cylinders 109 and piston rods relative to the cylinders 109.

Therefore, in the molding apparatus of this type, four mold cavities are formed by engaging the movable mold members 116 and 116' with the stationary mold members 104 and 105, and the movable mold members 117 and 117' with the movable mold members 110 and 111, respectively. When only one cylinder is provided between the movable frame, it should be secured around the center of the movable frame; otherwise, load incident to the actuation of the cylinder is not uniformly exerted on the movable frame, and may cause leakage of steam, etc. during the molding operation and result in failure to produce high quality shaped articles of foamed thermoplastic resin. Therefore, reinforcing frames need by provided extending from each end of the movable frame to the central portion of the frame where the cylinder is provided, and by utilizing this reinforcing frame, the load exerted on the central portion is distributed throughout the movable frames to obtain a uniform load. Furthermore because of possible cracks in the movable frame, owing to excessively high load on the central portion, load distributing frames need be provided extending from the central portion to each end of the movable frame. Frames, therefore, should be provided in a radial or linear fashion extending from the central portion to each end of the movable frame. Frames therefore, should also be provided in a radial or linear fashion extending from each end of the movable frame to the central portion. As a result of providing frames in the movable frames, spaces on the movable frames become narrower, and it often becomes impossible to provide in the movable frame an opening for charging the granules of a foamable thermoplastic resin, or an opening for introducing steam for heating these granules. Thus it is impossible to provide an additional movable frame between the stationary frame and the movable frame. By providing a plurality of cylinders, however, the cylinders can be secured to the end portions of the movable frame, in which case a uniform load can be exerted throughout the movable frame without providing any frames in the movable frame. Thus, the spaces on the movable frame are not rendered narrow, but material charge openings or steam introducing openings can be provided on the movable frame.

Knock-out pin push plates 123 and 123' are provided integrally with the frames 107 and 108, respectively, so as to move the knock out pins 122 and 122' with the slidable movement of the frames 107 and 108 in a manner to open the respective mold cavities, and to remove the shaped articles of thermoplastic resin adhered to the stationary mold members 104 and 105 respectively. Where slidable frames are provided between the movable frames 107, 108 and the stationary frames 102, 103, respectively, knock out pins and knock-out pin push plates are also provided on the movable frames 107 and 108, and knock out pins 122 and 122' are provided on the stationary mold member 104 and 105 respectively. The knock out pins 122 and 122', which have been ejected into the mold cavities by the action of the push plates 123 and 123', are returned to their original positions by springs 121 and 121'. Hoppers 124 and 124' adapted to contain a supply of foamable thermoplastic resin granules are supported upwardly of the stationary frames 102 and 103. In order to obtain a foamed shaped article of low density; it is preferred to use foamable thermoplastic resin granules which have been pre-expanded to a density of 0.033 to 0.016 g/cm$^3$.

The production of shaped articles foamed thermoplastic resin according to the second embodiment of the invention described above will now be described.

A hydraulic or pneumatic pressure is exerted on the cylinders 109 and 109' to eject the piston rods 191 and 191', and the mold members 104 and 105 are brought into engagement with the movable mold members 110 and 111, respectively. The cylinders 112 and 112' are actuated to hold the frames 107 and 108 stationary by the locking rods 113 and 113' and the stoppers 114 and 114', and a mold cavity is formed between the mold members 104 and 110, and between the mold members 105 and 111. Pre-expanded polystyrene granules of a density of approximately 0.020g/cm$^3$ are charged from the hoppers 124 and 124' into the mold cavities through charge openings provided in the stationary molds 104 and 105. The charge openings are then closed, and steam having a temperature of approximately 100–120°C. is blown into the cavities through heating medium feed openings provided in the mold members 104, 105, 110 and 111. The foamed polystyrene granules are heated for one minute and thirty seconds by the steam. After heating, the supply of steam is cut off and cooling water is introduced through cooling water feed openings for 2 minutes, whereby the foamed shaped article is cooled until it no longer expands. The locking rod 113 and the stopper 114 are then disengaged from the frame 107, and the movable mold member 110 is moved to open the mold cavity. At the same time, the push plate 123, provided integrally with the frame 107, slides with the sliding movement of the frame 107, and pushes the knock out pin 122, thereby to remove the foamed shaped article adhered to the stationary mold member 104. After mold release, the cylinders 109 and 109' are again pressurized to eject the piston rods 191 and 191', with the frame 108 held stationary acting as a support, and the movable mold member 110 comes into engagement with the stationary mold member 104 to form a mold cavity. At this time, the knock out pin 122 is retracted by the spring 121. The cylinder 112 is then actuated to cause the locking rods 113 and the stopper 114 to clamp the mold cavity and hold the frame 107 stationary. Again, foamed polystyrene granules are charged into the mold and shaped in the same way as described above. When, during the molding operation, the hydraulic pressure is cut off to retract the cylinder 112' and thus to release the locking rod 113' and the stopper 114', and the hydraulic pressure on the cylinders 109 and 109' is also cut off so as to retract them, the cylinders 109 and 109' simultaneously advance with the frame 107 as a support in a manner to include the piston rods 191 and 191' therein, and move the movable mold member 111 to open the mold cavity. Simultaneously with this, the knock out pin push plate 123' provided integrally with the frame 108 slides together with the sliding movement of the frame 108 and pushes the knock out pin 122', thereby to remove the foamed shaped article adhered to the stationary mold member 105. After mold release, the hydraulic pressure is cut off to push out the cylinders 109 and 109' whereby bringing the stationary mold member 105 into engagement with the movable mold member 111 to form a mold cavity. The same operation as described above is then repeated. Thus, the molding of foamable polystyrene granules can be performed in the respective mold cavities substantially independently from each other.

The shaped article of foamed polystyrene obtained has a density of approximately 0.020 g/cm$^3$ and the polystyrene granules are completely fused and coalesced to one another.

Since in the molding apparatus of the present invention a plurality of cylinders are rendered slidable and operable simultaneously in the same direction and in parallel relation with each other, the molding operation can be efficiently performed without any trouble even if the molding conditions are different in the two mold cavities. Furthermore, one molding apparatus according to the foregoing embodiment has an output capacity corresponding to two conventional molding machines. When additional movable frames are provided between the stationary frames and the movable frames, and mold members corresponding to the stationary and movable mold members are secured to both surfaces of the frames, four or more mold cavities can be formed. In this case, the output capacity of one apparatus corresponds to that of four or more conventional molding machines. Hence, shaped articles of formed thermoplastic resin can be produced at low cost. By providing a plurality of the cylinders at the end portions of the movable frames, the stationary mold members can be uniformly clamped with the movable mold members without providing reinforcing frames in the movable frames. A further advantage of the molding apparatus according to this second embodiment is that, when it is desired to exchange or repair one cold cavity, the stopper is deviated by an extent necessary for work and brought into engagement with the locking rod, whereby the exchange or repair work can be performed without stopping the molding operation in the other mold cavity.

What is claimed is:

1. An apparatus for producing a shaped article of foamed thermoplastic resin, said apparatus comprising, in combination: a machine stand; first and second stationary frames mounted in vertical relation on said stand at opposite ends thereof; a first stationary mold member secured to said first frame; a second stationary mold member secured to said second frame; a plurality of supporting rods in substantially parallel relation with said stand and having both ends fixed to said pair of frames; first and second movable frames disposed around and slidably mounted on said supporting rods; a slidable cylinder having a piston rod, the outer end of said piston rod being secured to said first movable frame and the rearward end of said cylinder being secured to said second movable frame; a first movable mold member secured to the end of said piston rod through said first movable frame; a second movable mold member secured to the rearward end of said cylinder through said second movable frame; and first and second locking devices for fixing said first and second movable frames to said machine stand, each of said locking devices comprising a slidable stopper provided on said machine stand, a cylinder having at least one piston rod and secured to each of said movable frames and locking rods secured to both ends of said piston rod for tight engagement with said stopper, wherein:

said first movable mold member is engageable with said first stationary mold member to form a first mold cavity which is chargable with granules of a foamable thermoplastic resin and adapted to form a foamed shaped article from said granules by exerting pressure on said cylinder so as to eject said piston rod while fixing said second movable frame to said machine stand under the action of said second locking device, and said first movable mold member being adapted to be separated from first stationary mold member to remove said article by releasing pressure from said cylinder so as to retract said piston rod into said cylinder while fixing said second movable frame to said machine stand under the action of said second locking device; and said second movable mold member is engageable with said second stationary mold member to form a second mold cavity that is chargable with granules of a foamable thermoplastic resin and adapted to form a foamed shaped article made from said granules by exerting pressure on said cylinder so as to slide said cylinder on the periphery of said piston rod in the direction of said second stationary frame while fixing said first movable frame to said machine stand under the action of said first locking device, and said second movable mold member is separable from said second stationary mold member to remove said article by releasing pressure from said cylinder so as to slide said cylinder on the periphery of said piston rod in a direction opposite to said second stationary frame while fixing said first movable frame under the action of said first locking device.

2. An apparatus for producing a shaped article of a foamed thermoplastic resin, comprising, in combination, a machine stand; first and second stationary frames mounted in vertical relation on said stand at opposite ends thereof; a first stationary mold member secured to one of said frames; a second stationary mold member secured to the other frame; a plurality of supporting rods in substantially parallel relation with said stand and having both ends fixed to said pair of frames; first and second movable frames disposed around and slidably mounted on said supporting rods; a plurality of slidable cylinders, each having a piston rod, the outer end of each piston rod being secured to said first movable plate and the rearward ends of said cylinders being secured to said second movable frame; a first movable mold member secured to the ends of said piston rods through said first movable frame; a second movable mold member secured to the rearward ends of said cylinders through said second movable frame; and first and second locking devices for fixing said first and second movable frames to said machine stand, each of said locking devices comprising a slidable stopper provided on said machine stand, a cylinder having at least one piston rod and secured to each of said movable frames and locking rods secured to both ends of said piston rod for tight engagement with said stopper, wherein:

said first movable mold member is engageable with said first stationary mold member to form a first mold cavity that is chargable with granules of a foamable thermoplastic resin and adapted to form a foamed shaped article made from said granules by exerting pressure on said cylinder so as to eject said piston rod while fixing said second movable frame to said machine stand under the action of said second locking device, and said first movable mold member is separable from first stationary mold member to remove said article by releasing pressure from said cylinder so as to retract said piston rod into said cylinder while fixing said second movable frame to said machine stand under the action of said second locking device; and said second movable mold member is engageable with said second stationary mold member to form a second mold cavity that is chargable with granules of a foamable thermoplastic resin therein and adapted to form a foamed shaped article made from said granules by exerting pressure on said cylinder so as to slide said cylinder on the periphery of said piston rod in the direction of said second stationary frame while fixing said first movable frame to said machine stand under the action of said first locking device, and said second movable mold member is separable from said second stationary mold member to remove said article by releasing pressure from said cylinder so as to slide said cylinder on the periphery of said piston rod in a direction opposite to said second stationary frame while fixing said first movable frame under the action of said first locking device.

3. An apparatus according to claim 2, wherein at least one slidable frame is provided between said first stationary frame and said first movable frame, and between said second stationary frame and said second movable frame, said slidable frame having movable mold members at both sides thereof.

* * * * *